UNITED STATES PATENT OFFICE.

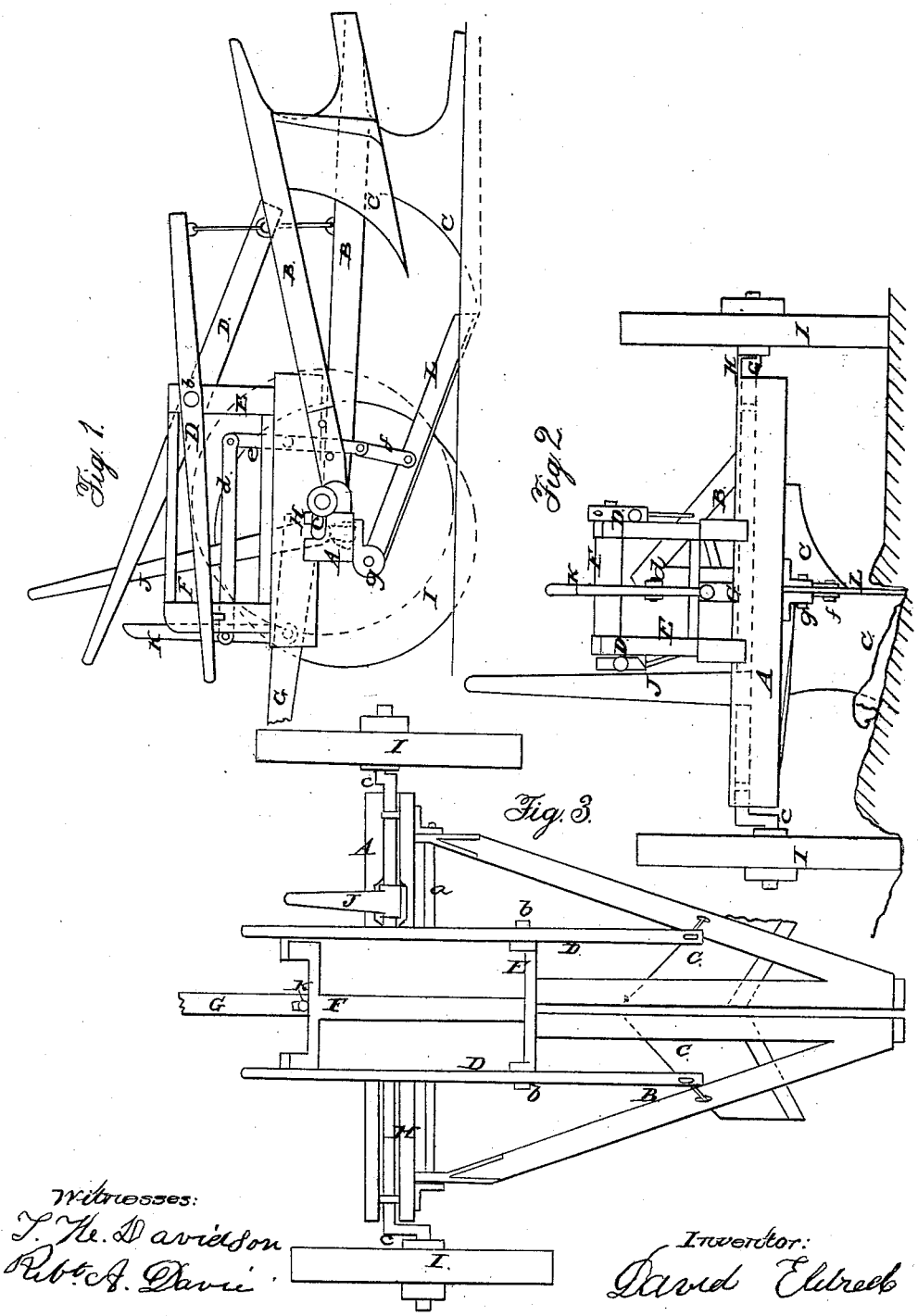

DAVID ELDRED, OF MONMOUTH, ILLINOIS.

IMPROVEMENT IN PLOWS.

Specification forming part of Letters Patent No. 25,816, dated October 18, 1859.

*To all whom it may concern:*

Be it known that I, DAVID ELDRED, of Monmouth, in the county of Warren and State of Illinois, have invented a new and Improved Plow; and I do hereby declare that the following is a full, clear, and exact description of the same, reference being had to the annexed drawings, making a part of this specification, in which—

Figure 1 is a side view of my invention. Fig. 2 is a front view of the same, and Fig. 3 a plan or top view of the same.

Similar letters of reference indicate corresponding parts in the several figures.

The object of this invention is to obtain a plow that will be capable of turning a furrow from the same side of the land while moving in either direction across the field, and also to obtain one that may be readily manipulated, and on which the driver may ride while the plow is in operation.

To enable those skilled in the art to fully understand and construct my invention, I will proceed to describe it.

A represents a bar or axle-bed, to the back side of which two frames, B B, are attached by a rod or joint, $a$, said frames being allowed to rise and fall freely on said rod as a center. To the outer end of each frame B a share, C, is attached. These shares may be of the usual form, and connected each with a proper mold-board. The landsides of the two shares, it will be seen, adjoin each other, so that the shares will cast the earth or turn a sod in opposite directions, as will be clearly understood by referring to Fig. 3. Each frame B has a lever, D, attached, and these levers are connected by fulcrum-pins $b$ to opposite sides of a small frame, E, on the axle-bed A, the frame E supporting the driver's seat F. To the axle-bed A a draft-pole, G, is attached, and in the upper surface of the bed A a shaft or rod, H, is fitted, said shaft or rod having a crank, $c$, formed at each end of it, one crank being at right angles to the other, and each having a wheel, I, on it. The rod or shaft H therefore, it will be seen, forms the axle of the machine, and to this axle a lever, J, is attached, which extends upward by the side of the driver's seat F.

In the draft-pole G, near its junction with the axle-bed A, a lever, K, is placed. This lever has a bar, $d$, attached to it, and to the back end of this bar a lever, $e$, is attached, the lower end of which is connected by a link, $f$, with a blade or colter, L, the front end of which is connected by a joint, $g$, to the under side of the axle-bed A. (See Fig. 1.)

The operation is as follows: As the machine is drawn along, one of the frames B, with its share C, is kept in an elevated state above the earth in consequence of its lever D being kept in a depressed state by a stop on the side of the frame E, and the other share operates in the usual way, turning a sod from its landside outward. As the machine arrives at the end of the field it is turned, and the share that previously operated is raised and the one that was elevated depressed, so that the latter is brought into operation and a sod is turned from the same side of the land. It will be seen, therefore, that a right-and-left-hand plow is obtained, or one capable of turning both a right and left hand furrow, and the ground will be plowed without leaving the ridges or furrows commonly termed "dead furrows," caused by the turning of the earth or sod in opposite directions at the junction of lands. The shares are adjusted by the driver on his seat actuating the levers D D.

The colter L may be elevated or depressed, so as to be operative or otherwise, by actuating the lever K. This colter is in line with the points of the shares, and may not only perform the legitimate function of a colter—to wit, the cutting of sod-ground—but may also serve in stock-ground to cut weeds in the path of the shares, and thereby facilitate the work of the latter. By having the wheels I I placed on cranks $c$, attached to an axle, H, at right angles to each other, the driver, by actuating the lever J, may elevate either wheel higher than the other, and thereby compensate for the difference in height between the bottom of the furrows and the surface of the unbroken land, as one wheel must necessarily run in a furrow. This adjustment of the wheels is necessary in order that the machine may work parallel with the surface of the earth.

I do not claim broadly the attaching of shares to adjustable frames, so that they may be elevated or depressed at the will of the driver, for this has been done in gang-plows; but I am not aware that a right-and-left share have been attached to adjustable frames and arranged to operate for the purpose specified.

I claim therefore as new and desire to secure by Letters Patent—

The arrangement for joint operation of the share-frames B B, axle H, and colter L, as and for the purpose set forth.

DAVID ELDRED.

Witnesses:
T. H. DAVIDSON,
ROBT. A. DAVIES.